(12) United States Patent
West

(10) Patent No.: US 8,430,444 B1
(45) Date of Patent: Apr. 30, 2013

(54) VEHICLE COVERING SYSTEM

(76) Inventor: Carl West, Sheridan, AR (US)

( * ) Notice: Subject to any disclaimer, the term of this patent is extended or adjusted under 35 U.S.C. 154(b) by 87 days.

(21) Appl. No.: 13/269,934

(22) Filed: Oct. 10, 2011

(51) Int. Cl.
*B60J 1/00* (2006.01)

(52) U.S. Cl.
USPC .......................... 296/77.1; 296/78.1; 296/84.1

(58) Field of Classification Search ................ 296/77.1, 296/78.1, 79, 80, 81, 82, 83, 84.1
See application file for complete search history.

(56) References Cited

U.S. PATENT DOCUMENTS

| | | | | |
|---|---|---|---|---|
| 856,375 A | * | 6/1907 | Stocking | 296/80 |
| 981,771 A | * | 1/1911 | Kretz | 296/77.1 |
| 1,551,889 A | * | 9/1925 | Lopez | 296/109 |
| 3,301,589 A | * | 1/1967 | Hayden | 296/102 |
| 3,819,226 A | * | 6/1974 | Sykora | 296/90 |
| 3,979,147 A | * | 9/1976 | Kelley | 296/78.1 |
| 4,632,448 A | * | 12/1986 | Yagasaki et al. | 296/218 |
| D332,239 S | | 1/1993 | Hirata et al. | |
| 5,310,235 A | * | 5/1994 | Seymour et al. | 296/77.1 |
| 5,393,118 A | * | 2/1995 | Welborn | 296/147 |
| 5,458,390 A | * | 10/1995 | Gilbert | 296/78.1 |
| 5,509,717 A | * | 4/1996 | Martin | 296/77.1 |
| 5,529,369 A | * | 6/1996 | Welborn | 296/146.1 |
| D433,651 S | | 11/2000 | Matsumura et al. | |
| 6,530,617 B2 | * | 3/2003 | McElwee et al. | 296/77.1 |
| 6,543,830 B1 | * | 4/2003 | Stuck | 296/77.1 |
| 6,547,027 B1 | | 4/2003 | Kalhok et al. | |
| 6,565,139 B2 | * | 5/2003 | Bayerle et al. | 296/77.1 |
| 6,916,059 B2 | * | 7/2005 | Feinberg | 296/79 |
| 6,926,334 B1 | * | 8/2005 | Diehm | 296/83 |
| 6,942,053 B2 | * | 9/2005 | Hinton | 180/209 |
| 7,066,526 B2 | | 6/2006 | Weddington et al. | |
| 7,216,926 B2 | * | 5/2007 | Hampel | 296/190.08 |
| 7,267,388 B2 | * | 9/2007 | Hanson et al. | 296/77.1 |
| 7,354,092 B2 | * | 4/2008 | Showalter et al. | 296/77.1 |
| 7,374,190 B2 | * | 5/2008 | Hong | 280/282 |
| 7,464,781 B2 | | 12/2008 | Guay et al. | |
| 7,854,463 B1 | * | 12/2010 | Neumann | 296/83 |
| 2002/0167190 A1 | * | 11/2002 | McElwee et al. | 296/77.1 |
| 2007/0182204 A1 | * | 8/2007 | Curtis et al. | 296/146.11 |
| 2008/0023249 A1 | | 1/2008 | Sunsdahl et al. | |
| 2008/0223633 A1 | | 9/2008 | Kim | |
| 2008/0280729 A1 | | 11/2008 | Miguchi | |
| 2008/0289896 A1 | | 11/2008 | Kosuge et al. | |

* cited by examiner

*Primary Examiner* — Lori Lyjak

(57) ABSTRACT

A vehicle covering system includes a vehicle that has a front fender, a rear fender, a pair of floor boards and a seat. The seat is positioned between the front and rear fenders and between the floor boards. A covering is removably positioned on the vehicle and is coextensive with the front fender, the rear fender and the floor boards to shield a person seated on the seat. A pair of doors is removably attached to the vehicle and each of the doors is pivotally coupled to one of a pair of side edges of the front fender. Each of a pair of latches is mounted one of the doors and releasably engages the rear fender to retain the doors in a closed position extending between the front and rear fenders.

11 Claims, 15 Drawing Sheets

VEHICLE COVERING SYSTEM

BACKGROUND OF THE DISCLOSURE

Field of the Disclosure

The disclosure relates to vehicle covering devices and more particularly pertains to a new covering device for a modified version of an all terrain vehicle for covering a person who is operating an all terrain type vehicle.

SUMMARY OF THE DISCLOSURE

An embodiment of the disclosure meets the needs presented above by generally comprising a vehicle that has a front fender, a rear fender, a pair of floor boards and a seat. The seat is positioned between the front and rear fenders and between the floor boards. A covering is removably positioned on the vehicle and is coextensive with the front fender, the rear fender and the floor boards to shield a person seated on the seat. A pair of doors is removably attached to the vehicle and each of the doors is pivotally coupled to one of a pair of side edges of the front fender. Each of a pair of latches is mounted one of the doors and releasably engages the rear fender to retain the doors in a closed position extending between the front and rear fenders.

An embodiment of the disclosure further meets the needs presented above by generally comprising a vehicle that has a front fender, a rear fender, a pair of floor boards and a seat. The seat is positioned between the front and rear fenders and between the floor boards. A covering is removably positioned on the vehicle and is coextensive with the front fender, the rear fender and the floor boards to shield a person seated on the seat. The covering includes a windshield that is attached to and extends upwardly from an upper portion of the front fender. The windshield has a pair of lateral edges each having a lateral window hingedly coupled thereto. The seat is positioned between the lateral edges. An upper cover includes a top wall and a rear wall. The rear wall is attached to and extends upwardly from the rear fender. The top wall extends over the seat and is coupled to the top edge of the windshield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
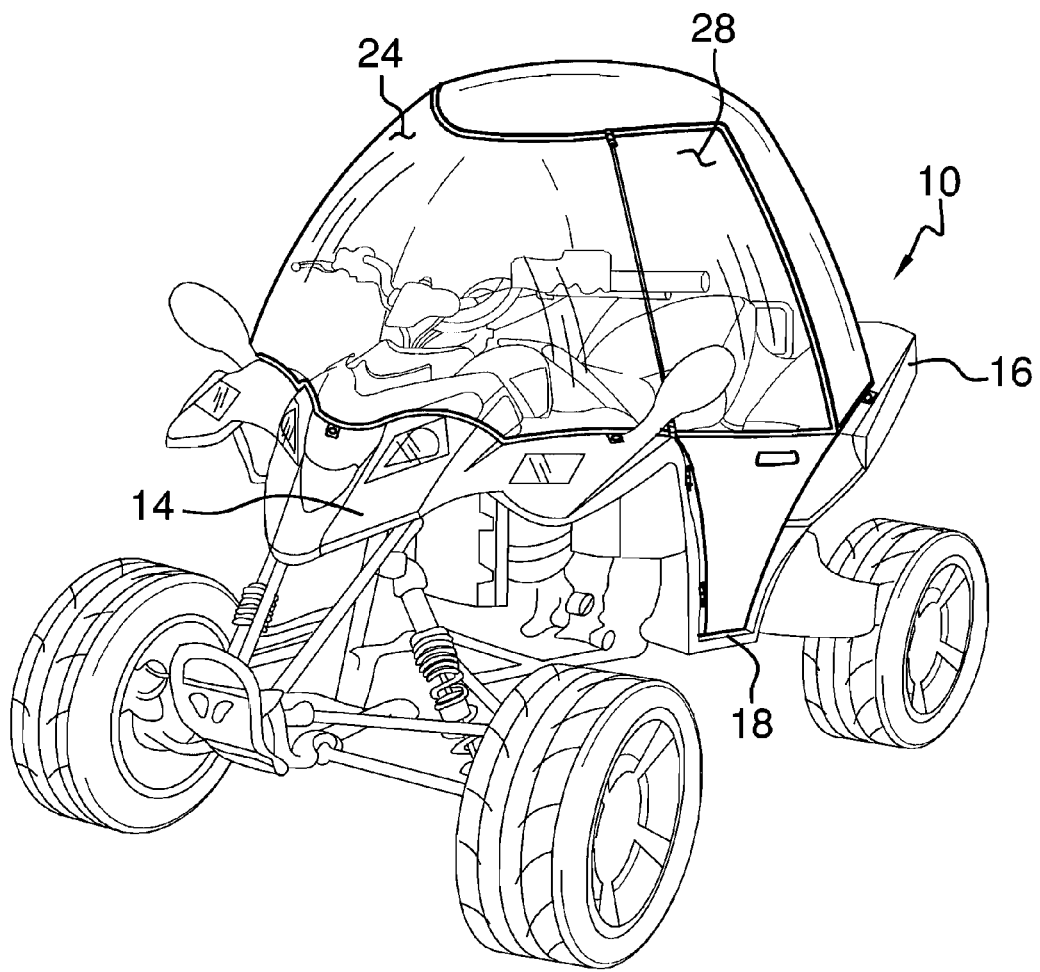
FIG. 1 is a front perspective view of a vehicle covering system according to an embodiment of the disclosure.
Figure 2:
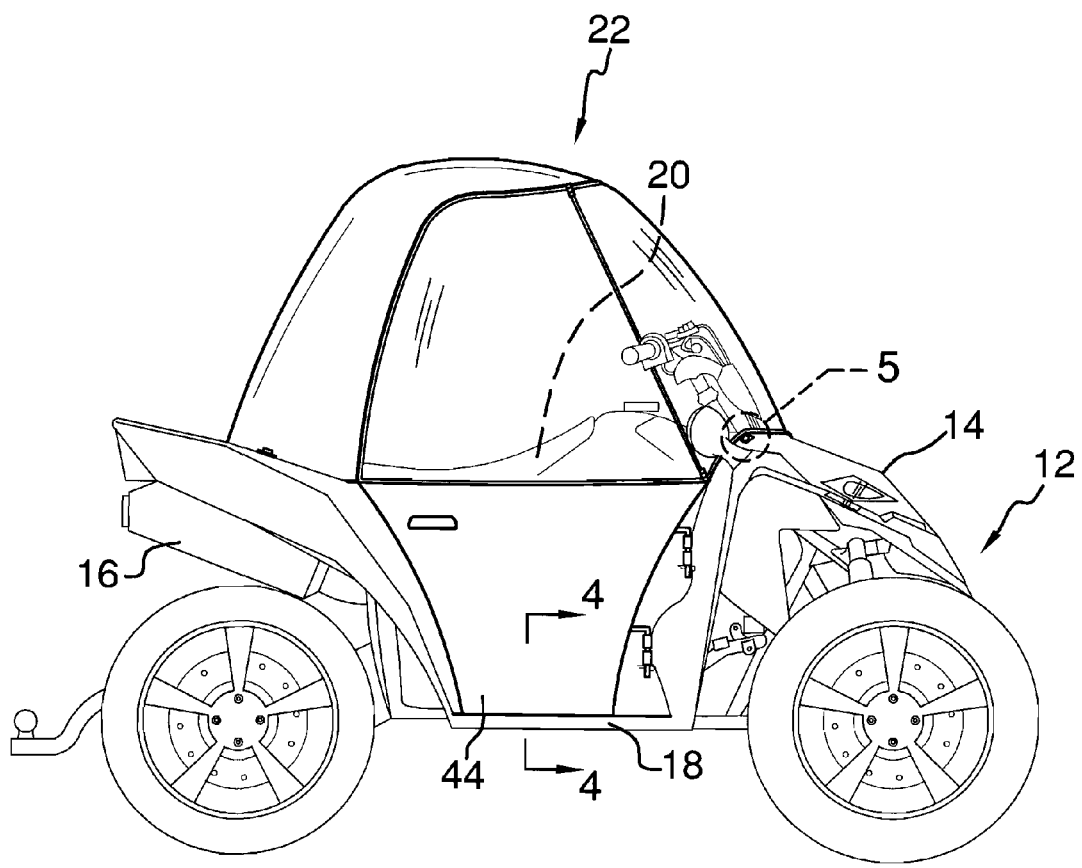
FIG. 2 is a side view of an embodiment of the disclosure.

With reference now to the drawings, and in particular to FIGS. 1 through 14 thereof, a new vehicle covering device embodying the principles and concepts of an embodiment of the disclosure and generally designated by the reference numeral 10 will be described.

As best illustrated in FIGS. 1 through 10, the vehicle covering system 14 generally comprises a vehicle 12 that has a front fender 14, a rear fender 16, a pair of floor boards 18 and a seat 20. The seat 20 is positioned between the front 14 and rear 16 fenders and between the floor boards 18. The vehicle is modeled after an all terrain vehicle such that the seat is elongated and intended to be straddled. Moreover, the turning mechanism will include handlebars instead of a steering wheel. Additionally, throttle, brake and other controls would likely be mounted on the handlebars. It should be understood that the vehicle may be a conventional all terrain vehicle or it may be partially or significantly modified depending on need and usage. In particular, the vehicle 12 may differ from off road all terrain vehicles by including a wider wheelbase, anti-lock disc brakes, headlights, brake lights, turn signals, larger wheels, a lower ground clearance, rear view mirrors and climate control, such as air conditioning and heating, for the purpose of making the all terrain vehicle safer for street driving and in particular more comfortable for driving at highway rated speeds. Such modifications would typically render the vehicle 12 unsuitable for off road driving due to low clearances and wheels not configured to engage rough terrain. Additionally, the vehicle 12 may be powered by a conventional gasoline powered engine, an electric motor, or a hybrid power supply combining the two.

A covering 22 is removably positioned on the vehicle 12 to help encapsulate a rider positioned on the seat 20. The covering 22 is coextensive with the front fender 14, the rear fender 16 and the floor boards 18 to facilitate the encapsulation of the seat 20 within the covering 22. The covering 22 includes a windshield 24 that is attached to and extends upwardly from an upper portion of the front fender 14. The windshield 24 has a pair of lateral edges 26 and the seat 20 is positioned between the lateral edges 26. A pair of lateral windows 28 is provided and each of the lateral windows 28 is hingedly coupled to one of the lateral edges 26. This allows the lateral windows 28 to be opened as needed for entering or leaving the seat 20. The lateral windows 28 may be constructed such that they are easily removable from the windshield 24. It should be understood that the windshield 24 may have other configurations than shown in the Figures such as having a front edge coming to a point or being angled more from the front edge rearward to promote more aerodynamic advantages.

Figure 3A:
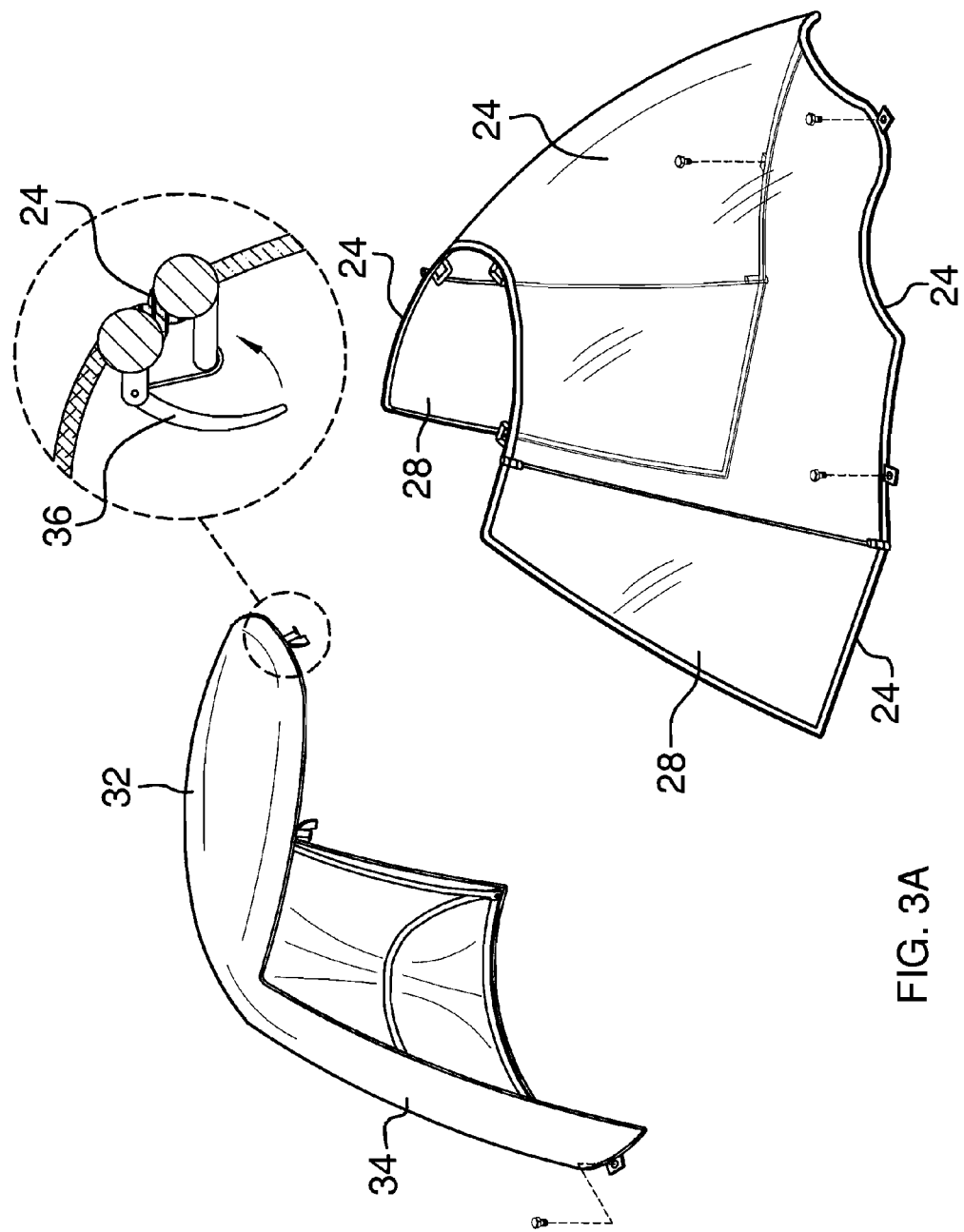
FIG. 3A is a front perspective view of an embodiment of a covering of the disclosure.
Figure 3B:
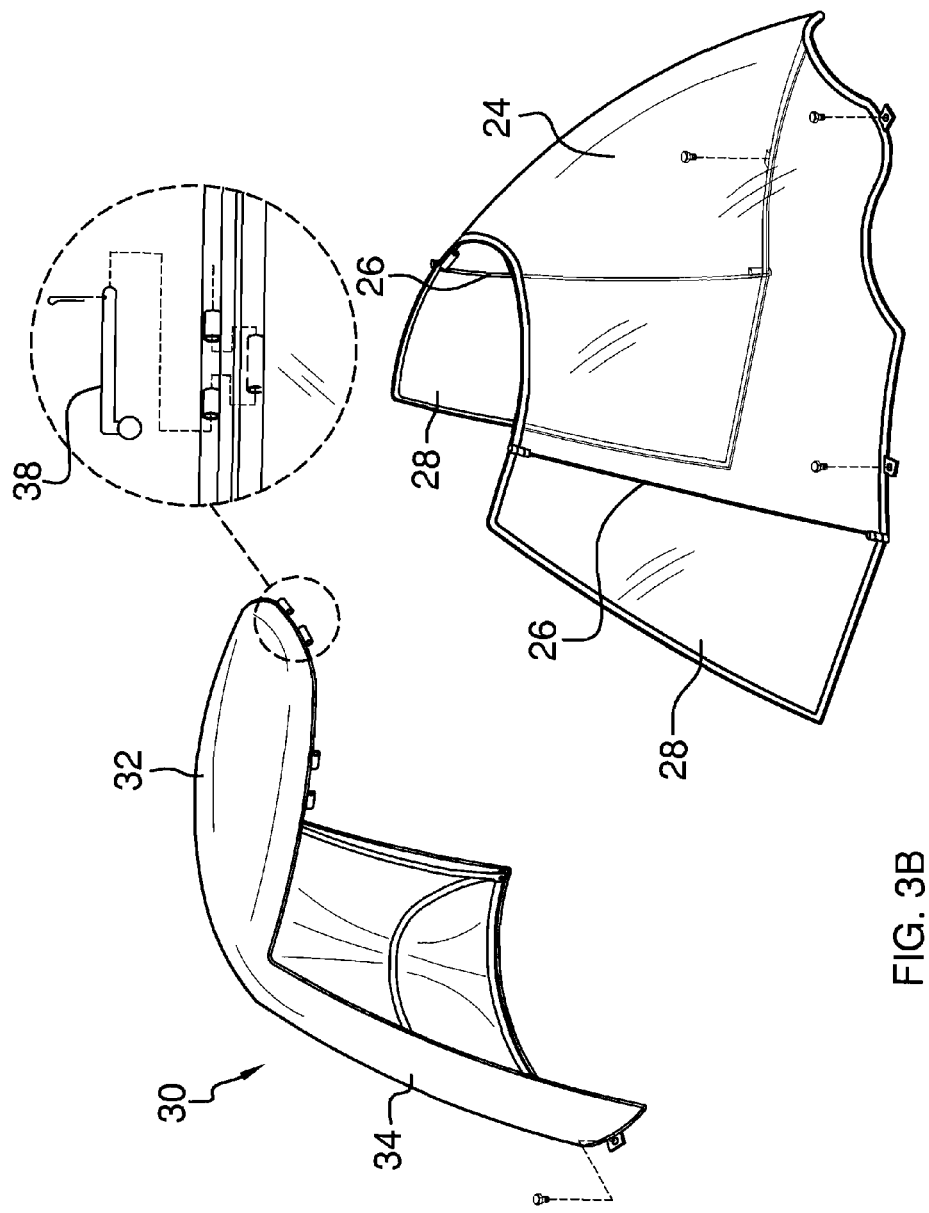
FIG. 3B is a front perspective view of an embodiment of a covering of the disclosure.
Figure 4:
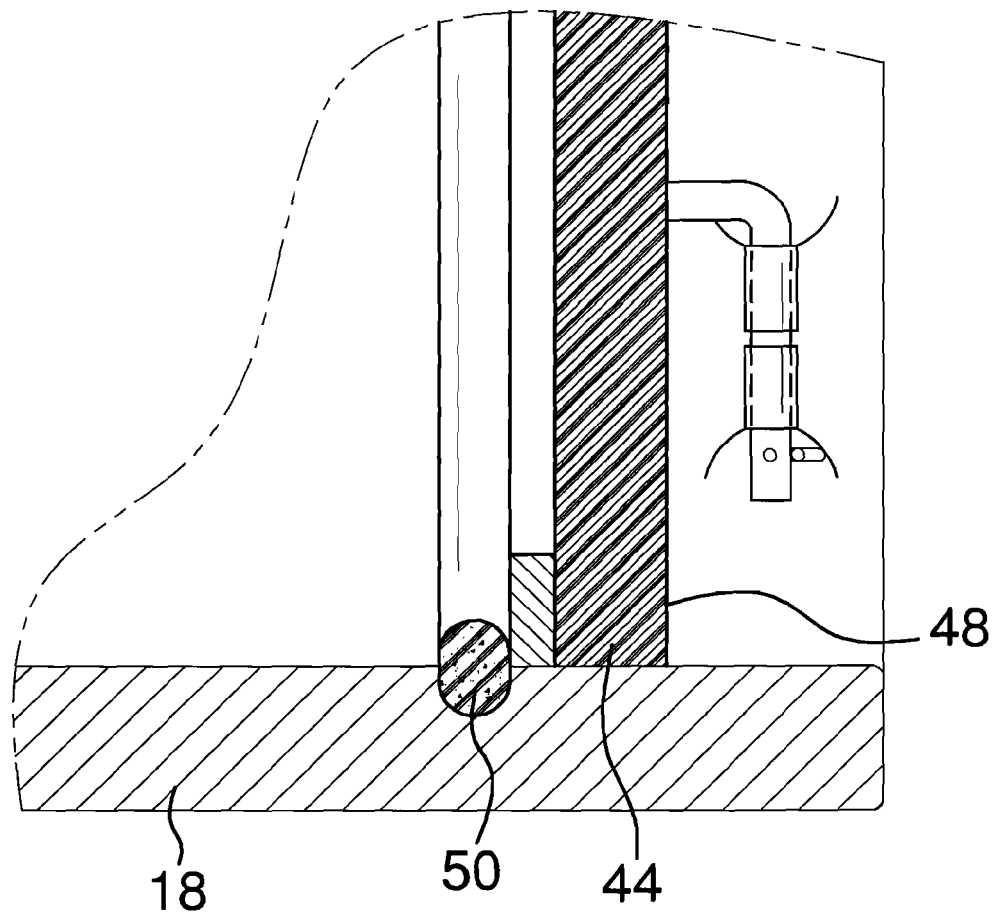
FIG. 4 is a cross-sectional view of an embodiment of the disclosure taken along line 4-4 of FIG. 5.
Figure 5:
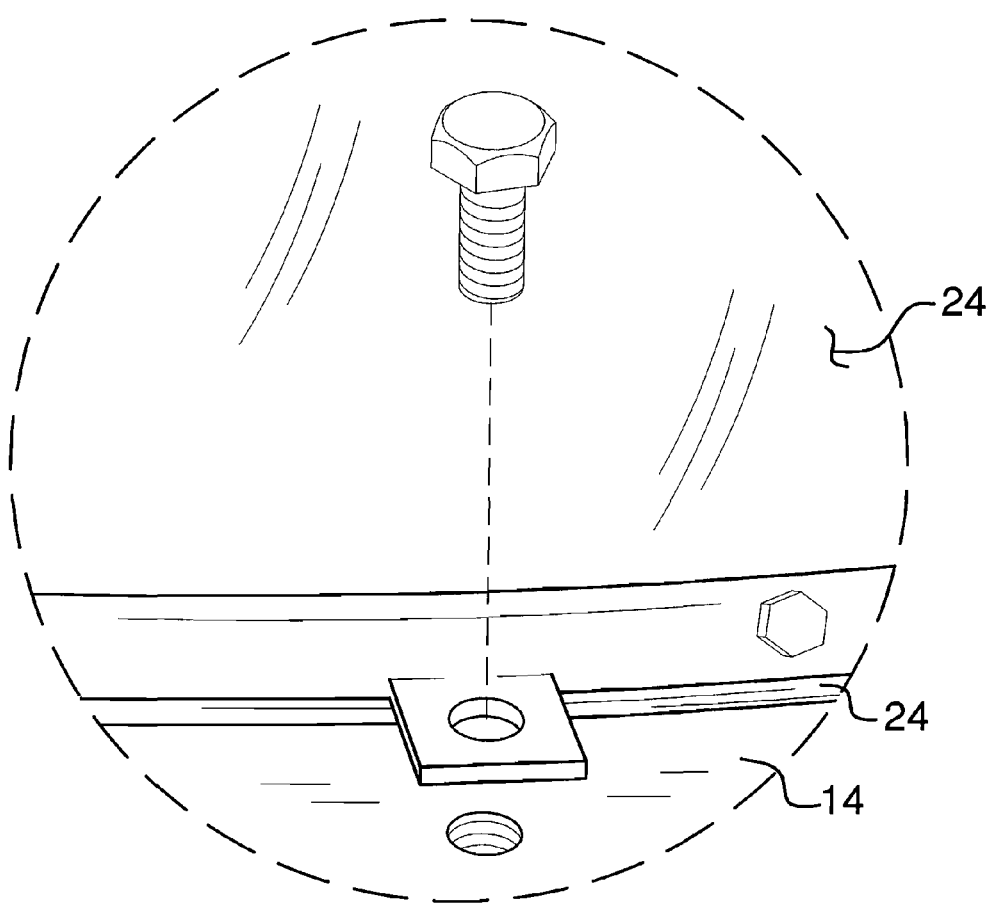
FIG. 5 is an enlarged exploded view of an embodiment of the disclosure of the area designated "5" of FIG. 2.
Figure 6:
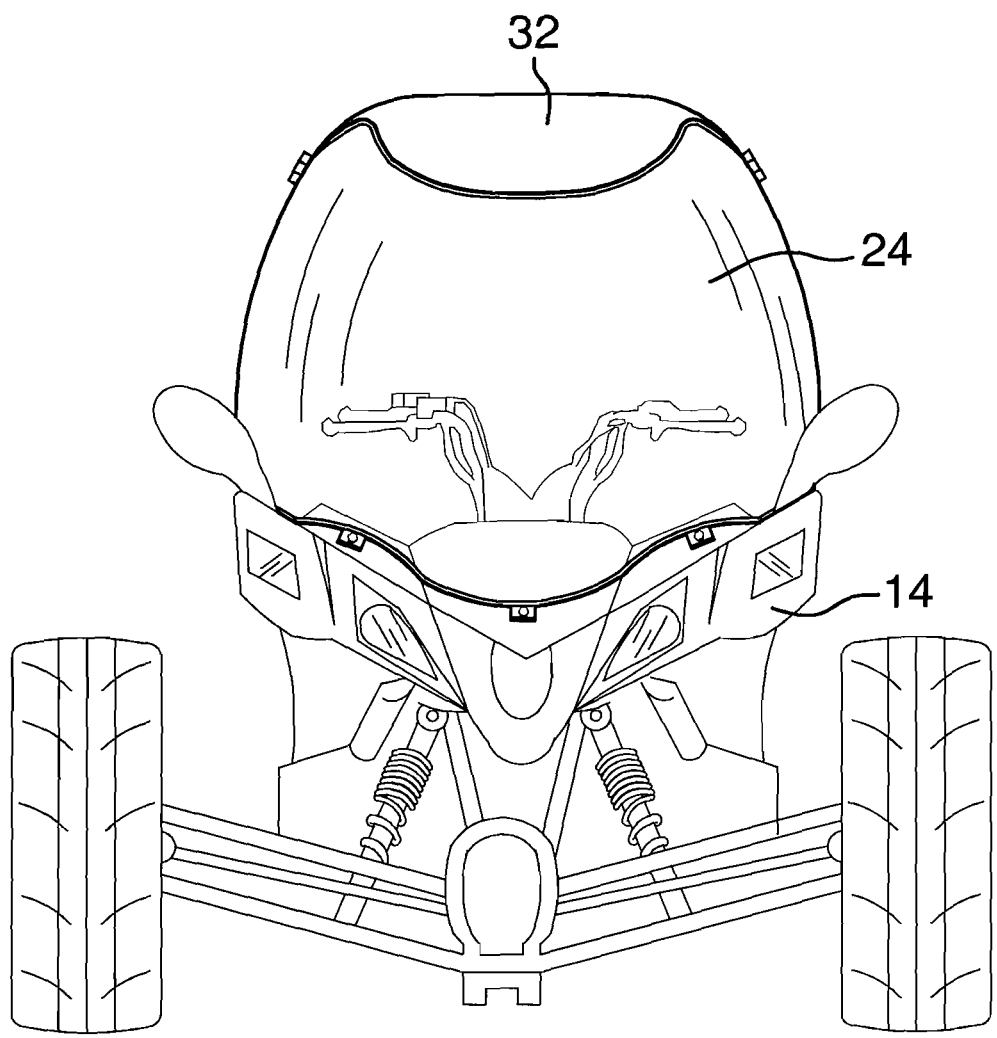
FIG. 6 is a front view of an embodiment of the disclosure.
Figure 8:
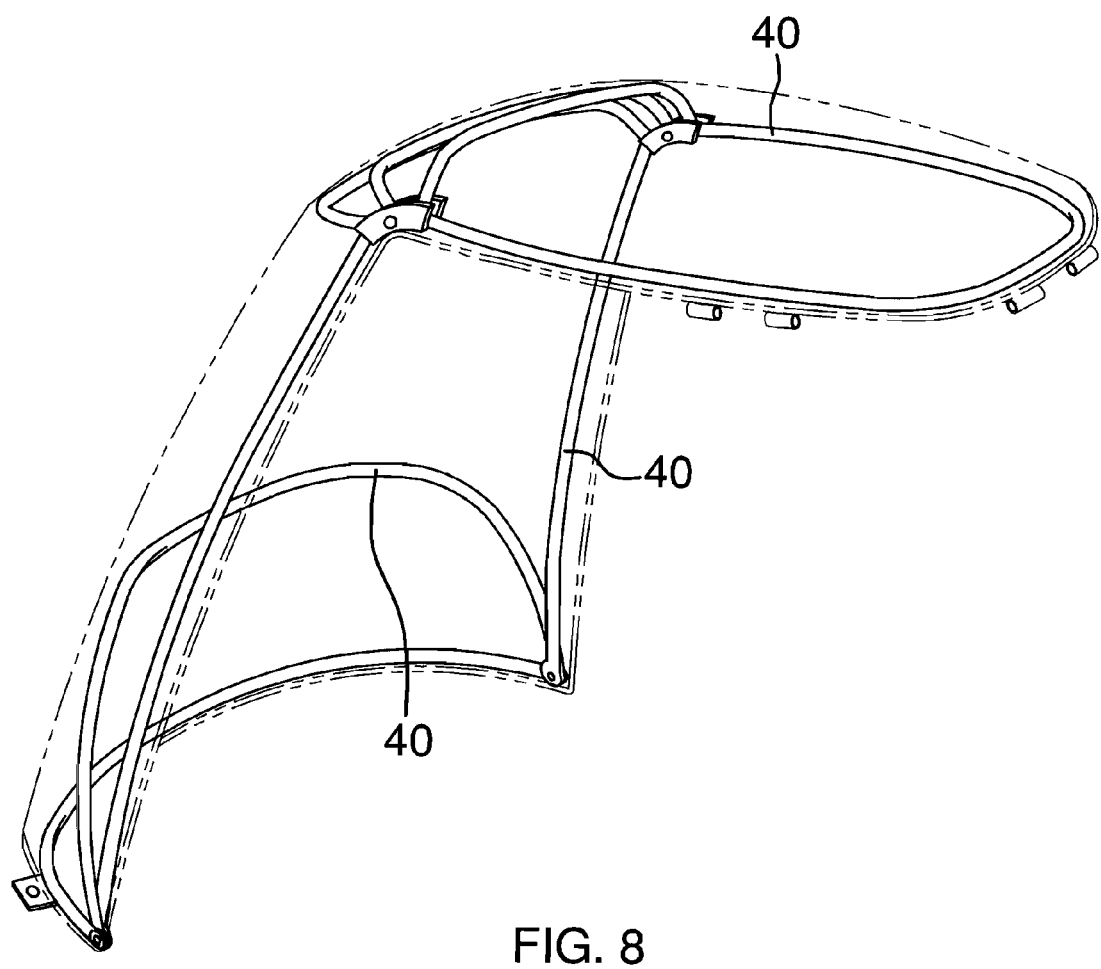
FIG. 8 is a perspective view of an embodiment of the covering of the disclosure.
Figure 10:
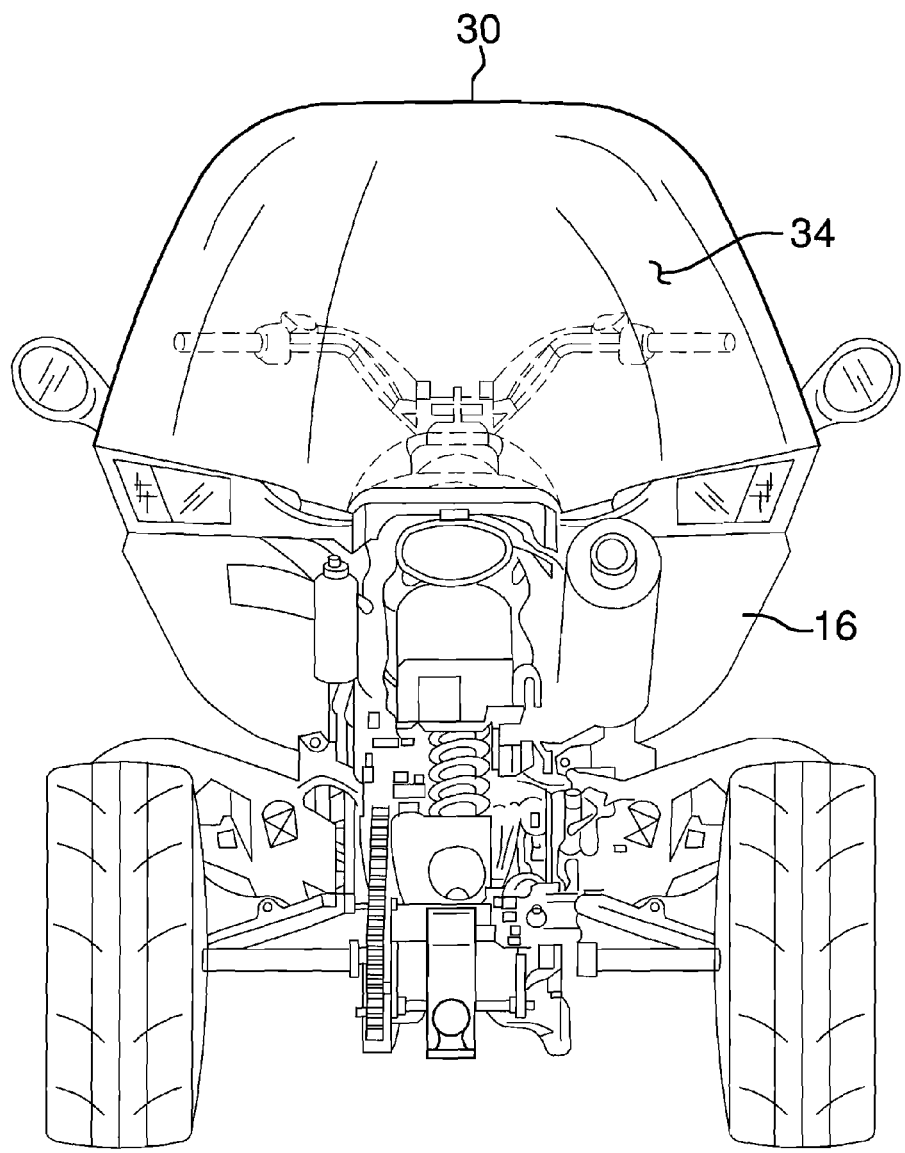
FIG. 10 is a rear view of an embodiment of the disclosure.
Figure 11:
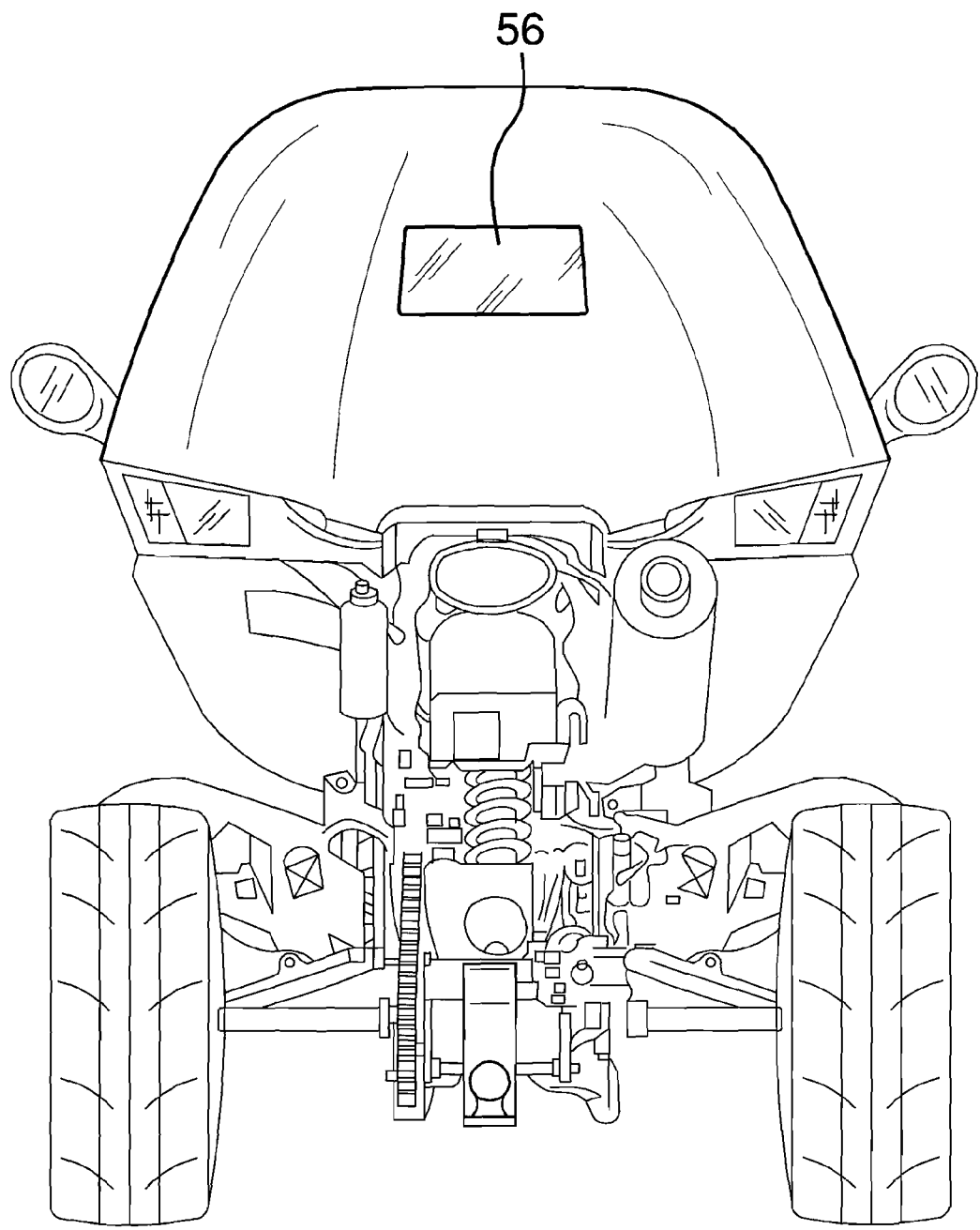
FIG. 11 is rear view of an embodiment of the disclosure.

An upper cover 30 includes a top wall 32 and a rear wall 34. The rear wall 34 is attached to and extends upwardly from the rear fender 16, while the top wall 32 extends over the seat 20 and is coupled to the top edge of the windshield 24. As can be seen in FIGS. 3A and 3B, the means of coupling the top wall 32 to the windshield 24 may be effected by way of clamps 36, pins 38 or other conventional means. Also, FIG. 8 depicts an upper cover 30 having pivotally coupled sections 40 covered by a flexible tarp to allow the upper cover 30 to be collapsed if not needed or desired while FIG. 10 depicts an embodiment of the cover 30 wherein the top 32 and rear 34 walls are comprised of a transparent material to allow a rider of the vehicle 12 to clearly see in all directions. A seal 42 may be positioned on the windshield 24 and the lateral windows 28 to inhibit air and water from flowing between the windshield 24 and lateral windows 28 and the upper cover 30. FIG. 11 depicts a window 56 which may be positioned in the upper cover 30. This will allow a person to more easily be able to see rearward while driving in reverse.

Figure 7:
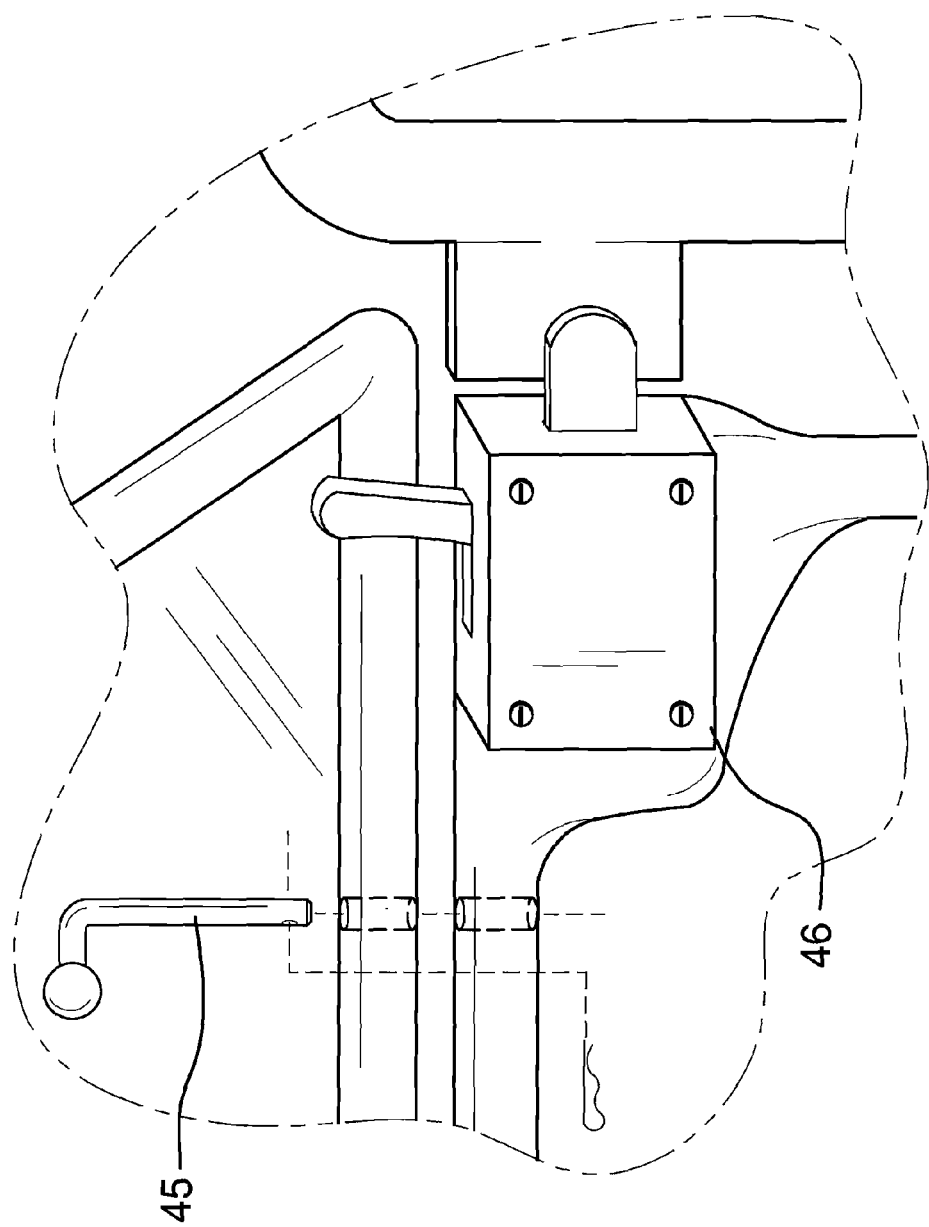
FIG. 7 is an enlarged perspective view of an embodiment of a latch of the disclosure.
Figure 9:
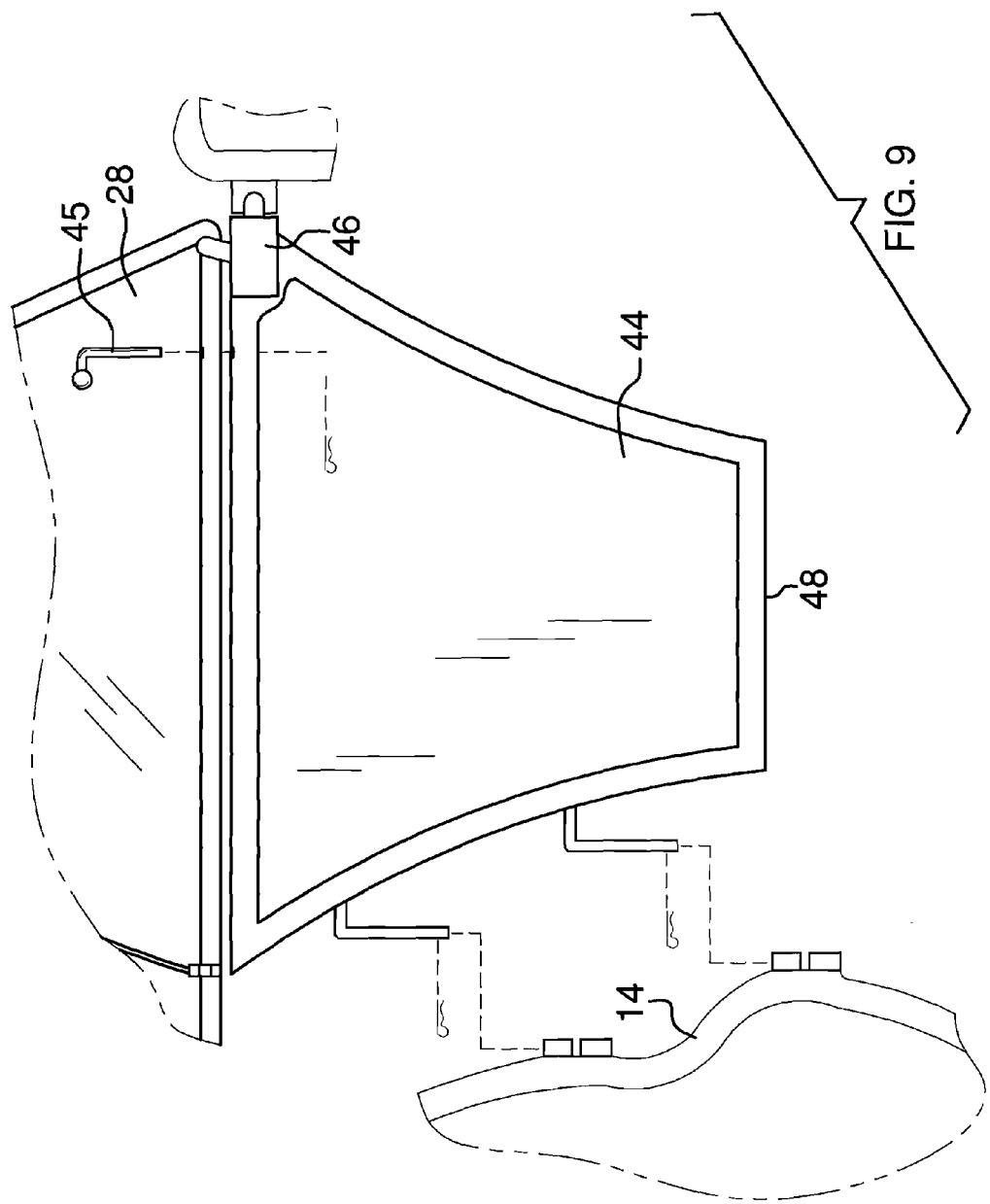
FIG. 9 is a side view of an embodiment of a door and lateral window of the disclosure.

A pair of doors 44 is removably attached to the vehicle 12. Each of the doors 44 is pivotally coupled to one of a pair of side edges of the front fender 14. The doors 44 are each alignable with one of the lateral windows 28 and each is couplable with an aligned one of the lateral windows 28 such that each of the doors 44 and the aligned one of the lateral windows 28 may be opened or closed together. FIG. 9 shows a pin mechanism 45 which may be used to couple a lateral window 28 to an associated door 44. FIG. 7 includes an enlarged view of a conventional latch 46, which is one of a pair of latches 46, that may be mounted on the doors 44 and releasably engaged with the rear fender 16 to retain the doors 44 in a closed position extending between the front 14 and rear 16 fenders. Each of the doors 44 has a bottom edge 48 and each of the floor boards 18 may have a seal 50 thereon against which the doors 44, adjacent their bottom edges, may abut when closed to prevent water and air from traveling between the floorboards 18 and the doors 44.

Figure 12:
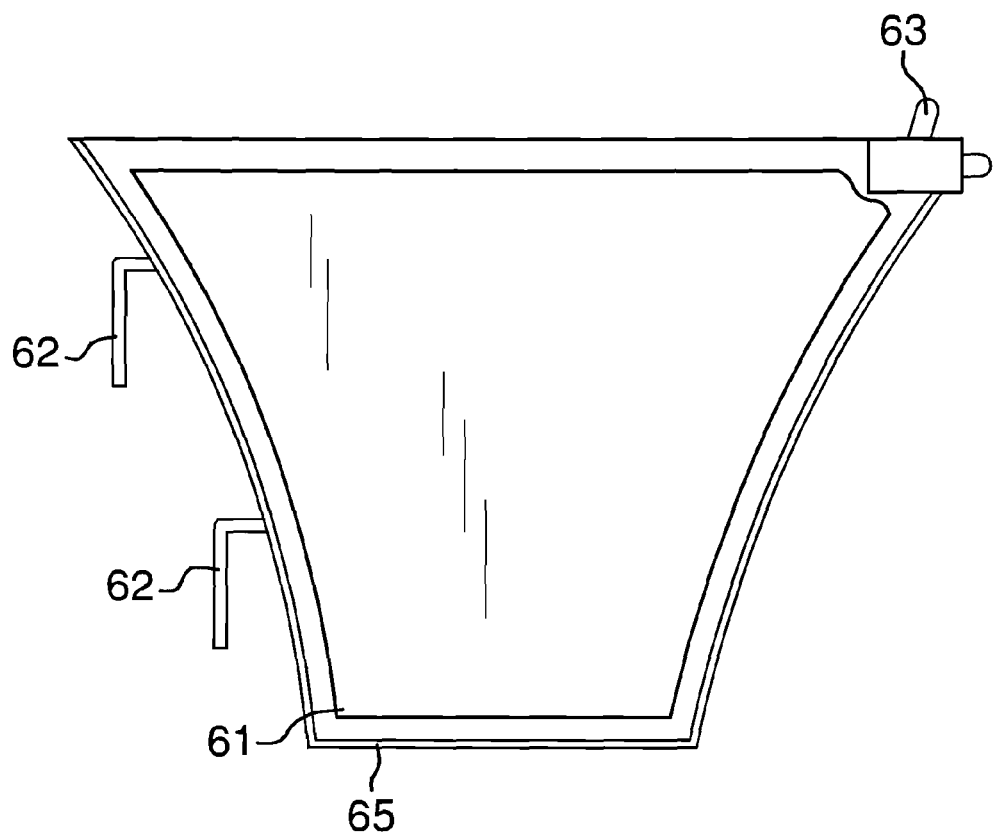
FIG. 12 is a side view of a door of an embodiment of the disclosure.
Figure 13:
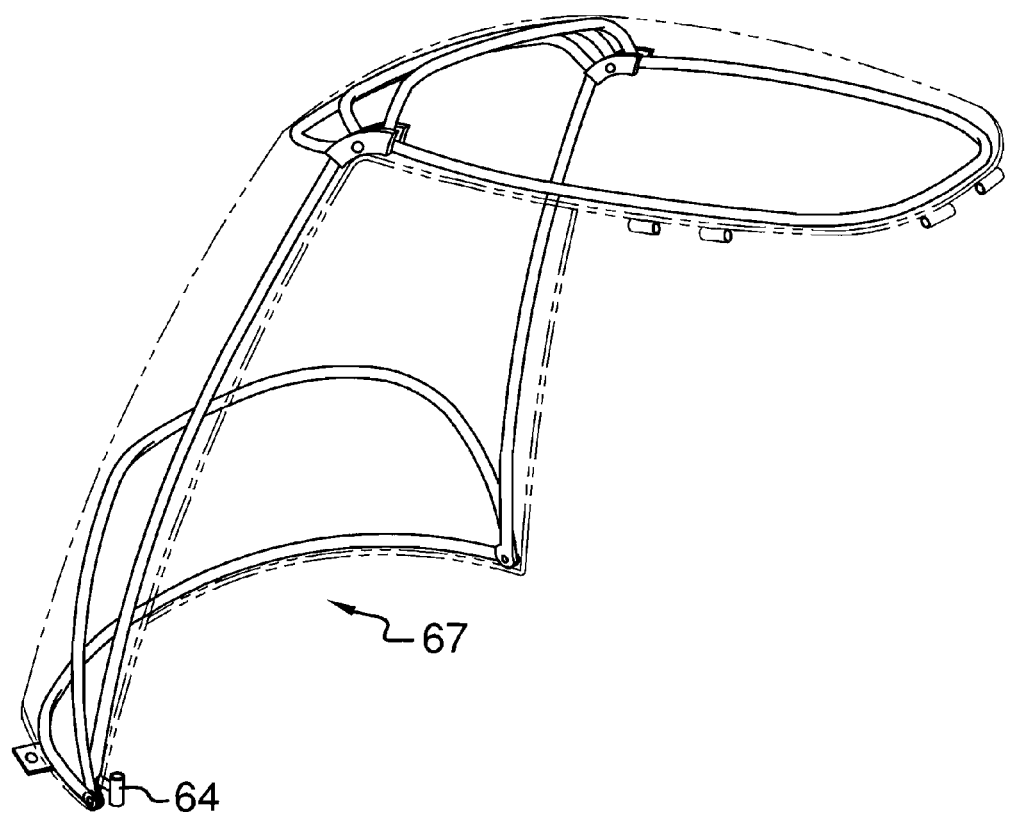
FIG. 13 is a perspective view of an embodiment of a covering of the disclosure.
Figure 14:
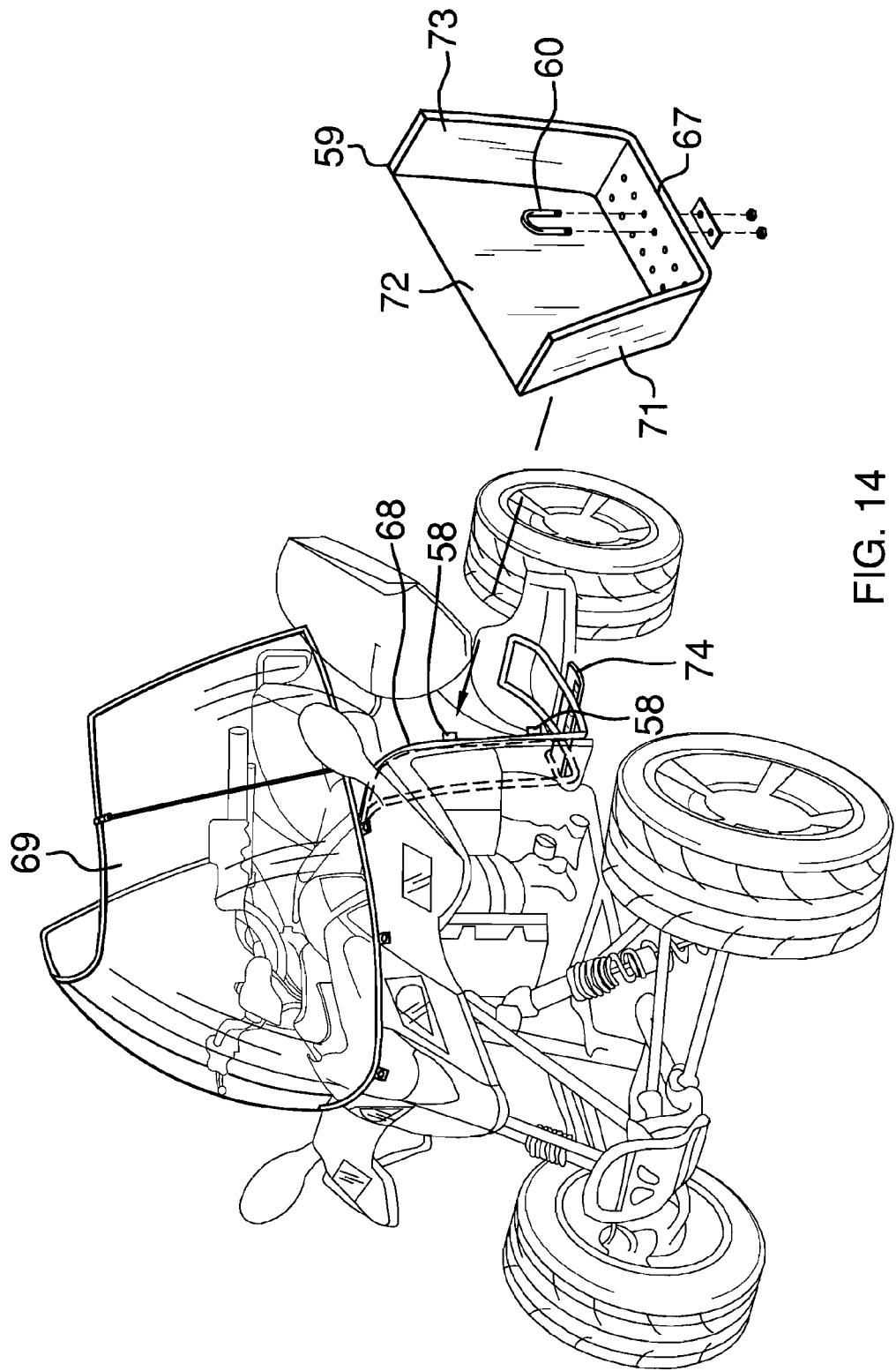
FIG. 14 is a rear view of an embodiment of the disclosure.

FIGS. 12-14 teach an embodiment that may be more readily retrofitted to a conventional all terrain vehicle. In particular, this embodiment will not include a vehicle having mounts welded thereto and therefore may include an upper cover 67 which includes a catch 64 for engaging latch 63 of a door 61. The door 61 includes seal 65. The door 61 includes couplers 62 that are extendable into sleeves 58 mounted on support rods 68 that extend downwardly from a windshield 69. Each side of the windshield 69 includes a pair of support rods 68 as is shown in FIG. 14 which extend downwardly and over the footrest 74. This allows a housing 59 to be mounted on the support bars 58. The housing 59 includes a bottom wall 70, front wall 71, inner wall 72 and rear wall 73 which, in conjunction with the door 61, encompasses a person's foot. A bracket 60 extends through the housing to engage the footrest 74 of the all terrain vehicle.

In use, the covering 22 is mounted on the vehicle 12 as stated above and as described in the Figures. The covering 22 allows a person to ride the vehicle 12 at relatively high speeds in comfort without concern about the elements.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A personal vehicle and covering system comprising:
   a vehicle having a front fender, a rear fender, a pair of floor boards and a seat, said seat being positioned between said front and rear fenders and between said floor boards;
   a covering being removably positioned on said vehicle, said covering being coextensive with said front fender, said rear fender and said floor boards to shield a person seated on said seat;
   a pair of doors being removably attached to said vehicle, each of said doors being pivotally coupled to one of a pair of side edges of said front fender; and
   a pair of latches, each of said latches being mounted one of said doors and releasably engaging said rear fender to retain said doors in a closed position extending between said front and rear fenders.

2. The system according to claim 1, wherein said covering including:
   a windshield being attached to and extending upwardly from an upper portion of said front fender, said windshield having a pair of lateral edges; and
   an upper cover including a top wall and a rear wall, said rear wall being attached to and extending upwardly from said rear fender, said top wall extending over said seat and being coupled to said top edge of said windshield.

3. The system according to claim 2, wherein said covering further includes a pair of lateral windows, each of said lateral windows being hingedly coupled to one of said lateral edges, said seat being positioned between said lateral edges.

4. The system according to claim 3, wherein said covering further includes a seal being positioned on said windshield and said lateral windows to inhibit air and water from flowing between said windshield and lateral windows and said upper cover.

5. The system according to claim 3, wherein each of said doors is alignable with one of said lateral windows, each of said doors being couplable with an aligned one of said lateral windows such that each of said doors and said aligned one of said lateral windows may be opened or closed together.

6. The system according to claim 1, wherein said covering including each of said floor boards having a seal thereon configured to abut one of said doors adjacent to an associated one of said bottom edges.

7. A personal vehicle and covering system comprising:
   a vehicle having a front fender, a rear fender, a pair of floor boards and a seat, said seat being positioned between said front and rear fenders and between said floor boards;
   a covering being removably positioned on said vehicle, said covering being coextensive with said front fender, said rear fender and said floor boards to shield a person seated on said seat, said covering including;
   a windshield being attached to and extending upwardly from an upper portion of said front fender, said windshield having a pair of lateral edges;

a pair of lateral windows, each of said lateral windows being hingedly coupled to one of said lateral edges, said seat being positioned between said lateral edges;

an upper cover including a top wall and a rear wall, said rear wall being attached to and extending upwardly from said rear fender, said top wall extending over said seat and being coupled to said top edge of said windshield.

8. The system according to claim 3, wherein said covering further includes a seal being positioned on said windshield and said lateral windows to inhibit air and water from flowing between said windshield and lateral windows and said upper cover.

9. The system according to claim 1, wherein said vehicle resembles an all terrain vehicle.

10. A personal vehicle and covering system comprising:

an vehicle having a front fender, a rear fender, a pair of floor boards and a seat, said seat being positioned between said front and rear fenders and between said floor boards;

a covering being removably positioned on said vehicle, said covering being coextensive with said front fender, said rear fender and said floor boards to encapsulate said seat within said covering, said covering including;

a windshield being attached to and extending upwardly from an upper portion of said front fender, said windshield having a pair of lateral edges;

a pair of lateral windows, each of said lateral windows being hingedly coupled to one of said lateral edges, said seat being positioned between said lateral edges;

an upper cover including a top wall and a rear wall, said rear wall being attached to and extending upwardly from said rear fender, said top wall extending over said seat and being coupled to said top edge of said windshield;

a seal being positioned on said windshield and said lateral windows to inhibit air and water from flowing between said windshield and lateral windows and said upper cover;

a pair of doors being removably attached to said vehicle, each of said doors being pivotally coupled to one of a pair of side edges of said front fender, each of said doors being alignable with one of said lateral windows, each of said doors being couplable with an aligned one of said lateral windows such that each of said doors and said aligned one of said lateral windows may be opened or closed together, each of said doors having a bottom edge, each of said floor boards having a seal thereon configured to abut one of said doors adjacent to an associated one of said bottom edges; and a pair of latches, each of said latches being mounted one of said doors and releasably engaging said rear fender to retain said doors in a closed position extending between said front and rear fenders.

11. The system according to claim 10, wherein said vehicle resembles an all terrain vehicle.

\* \* \* \* \*